March 26, 1968 W. HERMANNS 3,374,910
RECEPTACLE VEHICLE FOR BULK MATERIAL

Filed Aug. 10, 1965 2 Sheets-Sheet 1

Inventor:
Wilhelm Hermanns
BY
Mason, Porter, Diller & Brown
ATTORNEYS

United States Patent Office 3,374,910
Patented Mar. 26, 1968

3,374,910
RECEPTACLE VEHICLE FOR BULK MATERIAL
Wilhelm Hermanns, Frankfurter Strasse 462,
Porz-Urbach, Germany
Filed Aug. 10, 1965, Ser. No. 478,772
Claims priority, application Germany, Aug. 25, 1964,
H 53,630
3 Claims. (Cl. 214—83.28)

ABSTRACT OF THE DISCLOSURE

A receptacle vehicle for dispensing bulk material including a pressure tank type change-over receptacle, a plurality of bulk material storage cells. A compressor in communication with the change-over receptacle is operable to supply compressed air to the receptacle to discharge bulk material therefrom and is further operable to apply a vacuum to the receptacle to draw material from a pre-selected one of the storage cells into the change-over receptacle.

---

This invention relates to a receptacle vehicle for bulk material having a change-over receptacle provided in an air suction line, from the bottom of which a conveying line for the material to be changed-over is passed off, said receptacle also alternatingly being exertable to a vacuum and chargeable with compressed air, the material to be changed-over being sucked into the receptacle via the air suction line in the first case, the material available in the receptacle being discharged out of the receptacle via the conveying line by the compressed air in the latter case.

Prior art vehicles provided with such a change-over receptacle are used as change-over or material handling pumps provided for conveying a large quantity of a certain bulk material stored for instance in a factory shop or in a ship to some other distant site.

It is an object of the present invention to provide a receptacle vehicle permitting supplying for instance small plants requiring only relatively small quantities of a certain bulk material or plants requiring different sorts of bulk material with the respective desired bulk material in small quantities.

For this purpose, the invention suggests for a receptacle vehicle having a change-over receptacle of the type indicated that this vehicle carries, next to the change-over receptacle, still other relatively small bulk material cells selectably connectable to the free end of the air suction line, the capacity of said cells being somewhat smaller than that of the change-over receptacle, all or several of the bulk material cells also are permitted to be carried by a trailer of the automotive vehicle and it will be understood that the term vehicle as used herein encompasses such a trailer.

Figure 1:
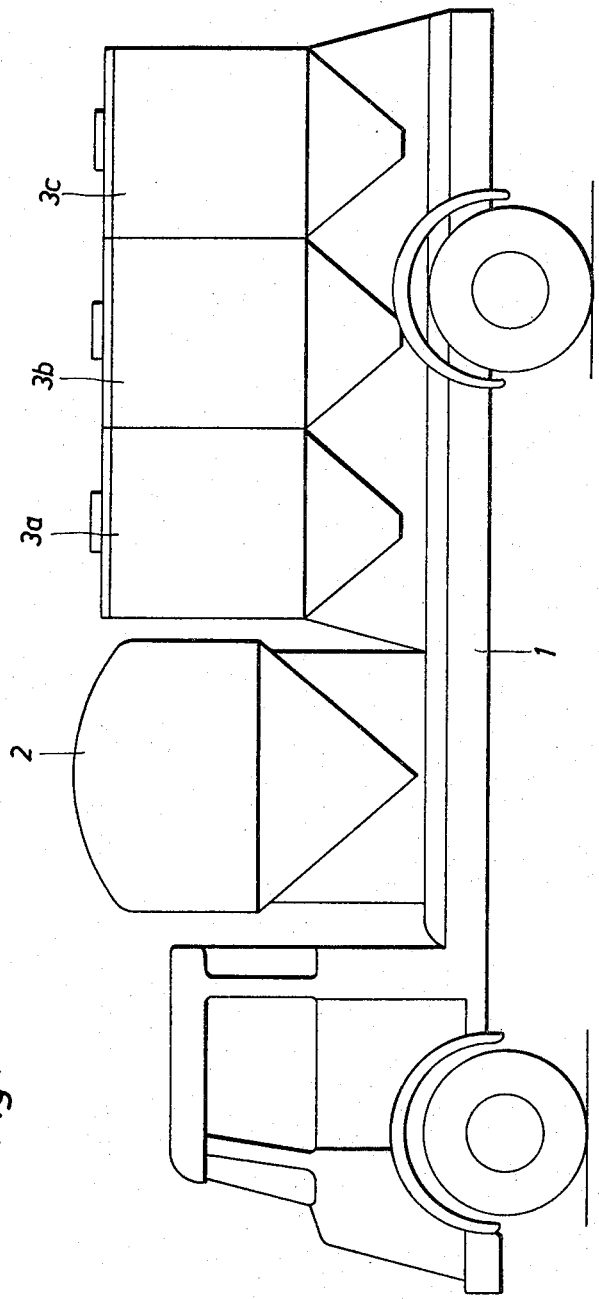
Figure 2:
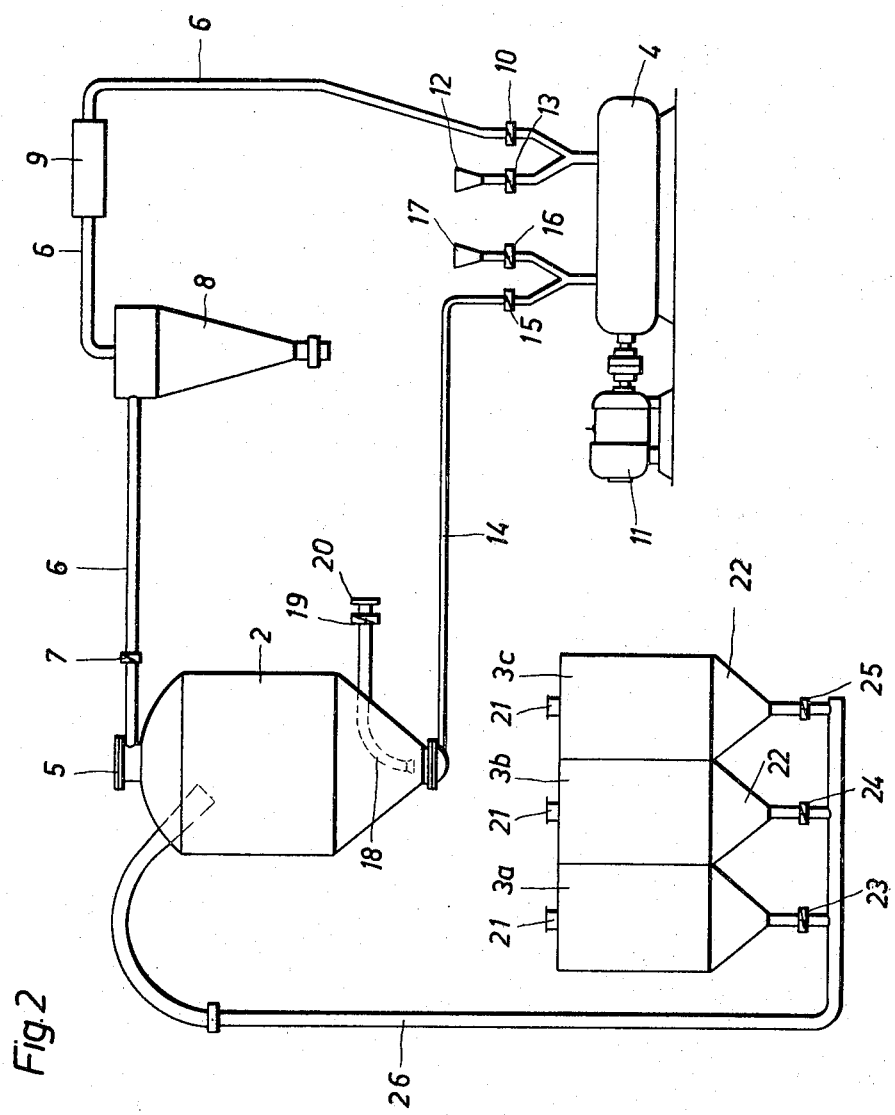

A receptacle vehicle of the present invention has been diagrammatically illustrated in one embodiment example in the accompanying drawing:

FIG. 1 shows a side elevation of the receptacle vehicle the undercarriage of which carries the change-over receptacle as well as the bulk material cells, whereas FIG. 2 diagrammatically illustrates the suction and pressure system of the vehicle.

A change-over receptacle 2 and a plurality of bulk material cells 3a, 3b and 3c are assembled on the undercarriage 1 of the vehicle shown in FIG. 1, the arrangement also being providable in such a manner that each of the bulk material cells as shown in the drawing embodying two bulk material cells arranged next to one another in transverse direction of the undercarriage. The size of the bulk material cells is selected such that the capacity of each individual cell corresponds to about the minimum amount required by the bulk material receiver, for instance 70 cu. ft., that this receiver, however, may also be supplied with an integral multiple of this by discharging a corresponding number of bulk material cells, whereas the contents of the remaining cells filled with the same or some other bulk material may be supplied to one or more other customers. The capacity of the change-over receptacle is rated to exceed the capacity of the individual bulk material cells only slightly, for instance is about 90 cu. ft. if the capacity is 70 cu. ft.

The change-over receptacle and the bulk material cells 3a, 3b and 3c are connected to one another in the manner illustrated in FIG. 2 by pipe and hose lines, respectively, and to a pneumatic unit 4 (compressor or the like) also carried by the undercarriage of the vehicle.

A line 6 provided with a shut-off means 7 leads to a cyclone 8 and goes on to the compressor 4 driven by the motor 11 via a dry-type filter 9 and a further shut-off means 10 from the change-over receptacle 2 provided with a manhole 5, a line 12 opening to atmosphere connected to the line portion intermediate the shut-off means 10 and the compressor 4, said line 12 also provided with a shut-off means 13.

A line 14 leads from the bottom of the change-over receptacle 2 to the compressor 4 via a shut-off means 15, and a branch line 17 opening to atmosphere and provided with a shut-off means 16 is connected to said line between the shut-off means 15 and the compressor 4.

The shut-off means 10, 13, 15 and 16 provided upstream of the compressor 4 are preferably controllable by a single hand lever in such a manner that the shut-off means 13 and 15 are closed in case the shut-off means 10 and 16 are opened, and vice versa.

A line 18 leads to atmosphere via a shut-off means 19 from the bottom of the change-over receptacle 2. A conveying line is connectable at 20 to the line 18.

The bulk material cells 3a, 3b and 3c which do not have to be pressure tanks are provided with charging sockets 21 and terminate in discharging hoppers 22 at the bottom so that the bulk material is capable of flowing out of the cells by effect of gravity. Each of the cells is connected to a line 26 with a respective intermediate shut-off means 23, 24 and 25 which leads to the top portion of the change-over receptacle 2. The cells are additionally provided with venting openings not illustrated.

The change-over receptacle 2 and the cells 3a, 3b and 3c are charged with the bulk material to be transported for operating the vehicle, such as cement.

After the vehicle has arrived at the plant to be supplied, the shut-off means 10 and 16 provided upstream of the compressor 4 are closed and thus the shut-off means 13 and 15 opened so that, if the compressor is operating, air is sucked in via the line 12 and pressed into the change-over receptacle 2 via the line 14. Due to the pressure build-up thus effected in the change-over receptacle, the bulk material contained in it is pressed into the conveying line going to the plant to be supplied and connected at 20 via the line 18 and the opened shut-off means 19.

In case the change-over receptacle 2 is emptied and in case the receiver having received the contents of the change-over receptacle is to also receive for instance the contents of the cell 3a filled with the same bulk material, the shut-off means 19 and the shut-off means 13 and 15 provided upstream of the compressor 4 are closed and thus the shut-off means 10 and 16 at the same time opened. Furthermore, the shut-off means 7 and the shut-off means 23 arranged underneath the cell 3a are opened. The compressor then exerts a vacuum effect on the bulk material flowing out of the cell 3a via the lines 6 and 26, thus conveying it into the change-over receptacle 2; the air sucked along is passed off to atmosphere via the line 6, the cyclone 8 and the dry-type filter 9 through the compressor 4 and via the line 17.

When the contents of cell 3a is in the change-over receptacle, the shut-off means arranged in the air suction line are closed, and compressed air is blown into the change-over receptacle 2 in the previously mentioned manner so that the contents of this receptacle is supplied to the customer via the conveying line 18. Accordingly, the customer may also be supplied with the contents of the remaining cells 3b and 3c.

It is, however, also possible to fill the cells 3a, 3b and 3c with different bulk material and to supply the bulk materials provided in the cells 3a, 3b and 3c to other customers in the previously mentioned manner after emptying the change-over receptacle at the first customer site.

What is claimed is:

1. A receptacle vehicle for bulk material having a change-over receptacle provided in an air suction line, a conveying line extending from the bottom of said receptacle for passing off the material to be changed-over, means for alternatively applying a vacuum to said receptacle and charging said receptacle with compressed air to cause the material to be changed-over to be sucked into the receptacle via the air suction line in the first case and to cause the material available in the receptacle to be discharged out of the receptacle via the conveying line by the compressed air in the latter case, and a plurality of relatively small bulk material cells carried by the same vehicle and selectably connectable to the free end of the air suction line, the capacity of said cells being somewhat smaller than that of the change-over receptacle.

2. A receptacle vehicle as set forth in claim 1 wherein several of the bulk material cells are carried by a trailer of the automotive vehicle carrying the change-over receptacle.

3. A bulk material dispensing and storing unit for use on a vehicle, comprising a change-over receptacle including means for dispensing material therefrom, a plurality of material storing cells of predetermined capacity on the vehicle, supply means for placing said material storing cells in communication with said change-over receptacle, compressor means, means communicating between said compressor means and said change-over receptacle for supplying air to said change-over receptacle for discharging material therefrom through said means for dispensing, and means for applying a vacuum to said change-over receptacle from said compressor means for drawing material from said material storing cells through said supply means into said change-over receptacle, said supply means comprising means for alternatively placing a selected one of said cells in communication with said change-over receptacle for supplying a predetermined amount of material to said change-over receptacle upon the application of a vacuum thereto.

References Cited

UNITED STATES PATENTS 2,116,603  5/1938  Holly _____ 214—83

FOREIGN PATENTS 517,963  3/1955  Italy.

GERALD M. FORLENZA, Primary Examiner.

ALBERT J. MAKAY, Examiner.